358-140. XR 3,182,124 SR

May 4, 1965 M. J. D. NURSE 3,182,124

MULTI-FREQUENCY FRAME SCAN GENERATOR WITH BOOT-STRAP AMPLIFIER TO PROVIDE CONSTANT AMPLITUDE OUTPUT

Filed May 9, 1962

T5067
X5055
Rm

Inventor
M. J. D. Nurse
By Holcombe, Wetherill & Brisebois
Attorneys

United States Patent Office 3,182,124

Patented May 4, 1965

3,182,124

MULTI-FREQUENCY FRAME SCAN GENERATOR WITH BOOT-STRAP AMPLIFIER TO PROVIDE CONSTANT AMPLITUDE OUTPUT

Michael J. D. Nurse, Cambridge, England, assignor to Pye Limited, Cambridge, England, a company of Great Britain Filed May 9, 1962, Ser. No. 193,582

Claims priority, application Great Britain, May 12, 1961, 17,411/61

8 Claims. (Cl. 178—7.3)

The present invention relates to a multi-frequency frame scan generator for use in television receivers or monitors which are desired to operate at any of two or more different television scanning standards having different frame frequencies and wherein the receiver or monitor will reproduce television pictures from different scanning standards without requiring any manual adjustment of the scanning circuits.

Most of the current television scanning standards employ a 50 cycle frame frequency except for the United States R.E.T.M.A. standards which employ a 60 cycle frame frequency. In order to provide a television receiver or monitor which will operate satisfactorily on a frame repetition frequency of either 50 or 60 cycles it is possible to employ a frame scan generator which has a suitably slow free-running speed and the incoming synchronising pulses will then determine the actual frame frequency. The scan generator may be a blocking oscillator or multivibrator whose output is fed to a boot-strap amplifier stage which provides a linear sawtooth waveform. The disadvantage of this arrangement however is that the output at one frame frequency may be of a different amplitude to the output at the other frame frequency.

According to the present invention an auxiliary output is taken from the boot-strap amplifier and fed to an amplitude control circuit which in turn controls the amplitude of the output from the boot-strap circuit to maintain it at a substantially constant amplitude at the different frame repetition frequencies.

According to one form of the invention, the auxiliary output from the boot-strap amplifier is fed to a valve whose anode load consists of a resistor forming part of a potential divider connected to a capacitor across the input of the boot-strap amplifier. Thus any variation in scanning amplitude will cause a variation in current through this valve and hence through the resistor in order to vary the potential to which the capacitor is allowed to charge through the potential divider and so stabilise the scanning amplitude at the desired level. The auxiliary output from the boot-strap amplifier may be fed to the amplitude control valve through a D.C. restorer and a rectifier and integrator circuit so that the potential at the grid of the amplitude control valve is proportional to the scanning amplitude.

According to another embodiment of the invention, particularly suitable for use when only a small output is produced by the frame oscillator, the auxiliary output from the boot-strap amplifier is fed to an amplifier valve which in turn feeds a further valve which forms part of a potential divider connected to a capacitor across the input of the boot-strap amplifier. The output of the amplifier valve may be fed to the further valve through a D.C. restorer and a rectifier and integrator circuit.

Figure 1:
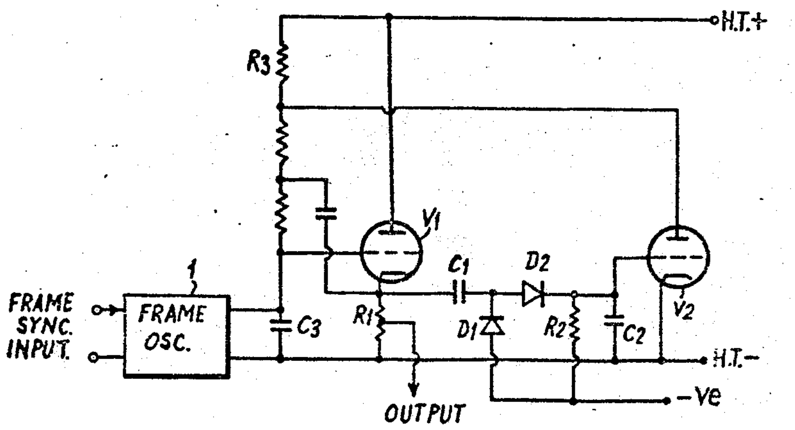
Figure 2:
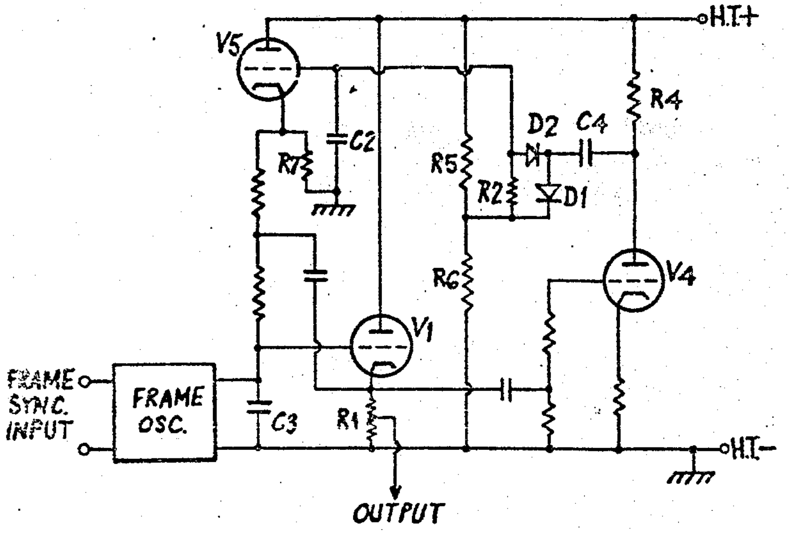

The invention will now be further described with reference to the accompanying drawings in which:

FIGURE 1 is a circuit diagram of one embodiment of a multi-frequency frame scan generator according to this invention, and FIGURE 2 is a circuit diagram of a further embodiment.

Referring to FIGURE 1, the frame scanning generator comprises a blocking oscillator or multi-vibrator 1 having a suitable slow free-running speed so that the frame synchronising pulses fed thereto determine the actual frame frequency. The output from the scanning generator is fed to the boot-strap amplifier valve V1 which provides a linear sawtooth output from a tapping on its cathode resistor R1. Besides the normal output from the boot-strap amplifier from which the sawtooth waveform is derived, an auxiliary output is taken from the cathode resistor R1 and is A.C. coupled through capacitor C1 to the grid of an amplitude control valve V2 via a D.C. restorer diode D1, connected to a stabilised negative potential, and a rectifier diode D2 and integrator circuit R2, C2, so that the potential at the grid of this valve is proportional to the scanning amplitude. The anode load of the valve V2 consists of a resistor R3 in the potential divider chain that provides the charge on the capacitor C3 connected across the input of the boot-strap amplifier. Thus the conductivity of the valve V2 is controlled by the scanning amplitude and as the anode load R3 of this valve is a resistor in the potential divider chain of the boot-strap circuit, any increase in scanning amplitude will cause an increase in current through this resistor to reduce the potential to which the capacitor C3 is allowed to charge via the potential divider and so stabilise the scanning amplitude at the desired level. A decrease in scanning amplitude has the reverse effect.

Referring now to FIGURE 2 wherein corresponding parts have been given the same references as in FIGURE 1, this embodiment is paritcularly intended for use where the output from the frame oscillator is only small. The auxiliary output from the bootstrap amplifier valve V1 is RC coupled to the grid of a valve V4 which is provided with an anode load resistor R4. The signal appearing at the anode of this valve is then fed via a capacitor C4 to the D.C. restorer diode D1 and a rectifier diode D2 and integrator circuit R2, C2. The diodes are connected with the opposite polarity as the signal is feeding a cathode follower stage V5. The restoring potential may now be derived from a potential divider R5, R6 across the HT supply. The cathode follower valve V5 takes the place of the resistor R3 in the embodiment of FIGURE 1 and itself forms a part of the potential divider chain of the boot-strap amplifier. This valve has its anode directly connected to the positive high tension supply line and its cathode is provided with a D.C. path to ground through resistor R7.

In this embodiment, variation in the scanning amplitude changes the conductance of V5 and hence alters the potential to which C3 is allowed to charge via the potential divider and so stabilises the scanning amplitude at the desired level.

Whilst a particular embodiment has been described it will be understood that various modifications may be made without departing from the scope of this invention. Thus it will be apparent that the circuit can be used with other scanning standards besides those specifically mentioned.

I claim:

1. In a multi-frequency frame scan generator circuit for use in television receivers which are desired to operate at any of at least two different television scanning standards having different frame frequencies and comprising a frame oscillator adapted to be triggered by frame frequency synchronising pulses, a boot-strap amplifier stage for linearising the output waveform of the oscillator, means for feeding the output of said oscillator to the boot-strap amplifier stage and means for deriving a linearised output scanning waveform from the output of the boot-strap amplifier stage, the improvement which comprises means for deriving an auxiliary output from said boot-strap amplifier stage, means for rectifying said auxiliary output, an amplitude control circuit fed by said rectified auxiliary output, and means connecting said amplitude control circuit to control the amplitude of the output scanning waveform from the boot-strap circuit to maintain it at a substantially constant amplitude at each of the different frame repetition frequencies.

2. A circuit as claimed in claim 1, in which the amplitude control circuit comprises a valve fed by said rectified auxiliary output, and means connecting a resistor forming part of a potential divider connected to a capacitor across the input of the boot-strap amplifier to form the anode load for said valve.

3. A circuit as claimed in claim 2, including restoring, rectifying and integrating means connected between said auxiliary output and the input to said valve.

4. A circuit as claimed in claim 1, in which the amplitude control circuit comprises an amplifier valve fed by said rectified auxiliary output, and a further valve fed by said amplifier valve, said further valve forming part of a potential divider connected to a capacitor across the input of the boot-strap amplifier.

5. A circuit as claimed in claim 4, in which said further valve is connected as a cathode follower stage and includes restoring, rectifying and integrating means connected between said amplifier valve and said further valve.

6. In a multi-frequency frame scan generator circuit for use in television receivers which are desired to operate at any of at least two different television scanning standards having different frame frequencies and comprising a frame oscillator adapted to be triggered by frame frequency synchronising pulses, a boot-strap amplifier stage for linearising the output waveform of the oscillator, means for feeding the output of said oscillator to the boot-strap amplifier stage and means for deriving a linearised output scanning waveform from the output of the boot-strap amplifier stage, the improvement which comprises means for deriving an auxiliary output from said boot-strap amplifier stage, means for restoring, rectifying and integrating said auxiliary output, an amplitude control circuit fed by said rectified auxiliary output, and means connecting said amplitude control circuit to control the amplitude of the output scanning waveform from the boot-strap circuit to maintain it at a substantially constant amplitude at each of the different frame repetition frequencies.

7. In a multi-frequency frame scan generator circuit for use in television receivers which are desired to operate at any of at least two different television scanning standards having different frame frequencies and comprising a frame oscillator adapted to be triggered by frame frequency synchronising pulses, a boot-strap amplifier stage for linearising the output waveform of the oscillator and including a valve having a resistive potential divider connected to a capacitor across the input to the valve, means for feeding the output of said oscillator to the boot-strap amplifier stage and means for deriving a linearised output scanning waveform from the output of the boot-strap amplifier stage, the improvement which comprises means for deriving an auxiliary output from said boot-strap amplifier stage, means for restoring, rectifying and integrating said auxiliary output, a valve fed by said rectified auxiliary output, and a resistor of said potential divider connected to form the anode load of said valve so as to control the amplitude of the output from the boot-strap circuit to maintain it at a substantially constant amplitude at each of the different frame repetition frequencies.

8. In a multi-frequency frame scan generator circuit for use in television receivers which are desired to operate at any of at least two different television scanning standards having different frame frequencies and comprising a frame oscillator adapted to be triggered by frame frequency synchronising pulses, a boot-strap amplifier stage for linearising the output waveform of the oscillator and including a valve having a potential divider connected to a capacitor across the input to the valve, means for feeding the output of said oscillator to the boot-strap amplifier stage, and means for deriving a linearised output scanning waveform from the output of the boot-strap amplifier stage, the improvement which comprises means for deriving an auxiliary output from said boot-strap amplifier stage, means for amplifying said auxiliary output, means for restoring, rectifying and integrating said amplified auxiliary output, and a further valve fed by said rectified and integrated auxiliary output and forming part of said potential divider so as to control the amplitude of the output from the boot-strap circuit to maintain it at a substantially constant amplitude at each of the different frame repetition frequencies.

References Cited by the Examiner

UNITED STATES PATENTS

| | | | |
|---|---|---|---|
| 2,846,617 | 8/58 | Nelson | 178—7.35 XR |
| 3,077,550 | 2/63 | Macovski | 315—27 XR |

DAVID G. REDINBAUGH, *Primary Examiner.*